United States Patent [19]

Sugisawa et al.

[11] Patent Number: 4,798,728
[45] Date of Patent: Jan. 17, 1989

[54] METHOD OF RETORT PACKAGING BROILED FISH AND PRODUCT THEREOF

[75] Inventors: Ko Sugisawa; Yasushi Matsumura, both of Nara; Hidefumi Okamoto, Osaka; Kumiko Abe, Nara, all of Japan

[73] Assignee: House Food Industrial Company Limited, Higashiosaka, Japan

[21] Appl. No.: 30,348

[22] Filed: Mar. 26, 1987

[30] Foreign Application Priority Data

Mar. 26, 1986 [JP] Japan ............... 61-44516[U]

[51] Int. Cl.⁴ ................. B65D 81/34; A23L 3/00; B65B 55/04; A23B 4/00
[52] U.S. Cl. ................. 426/129; 426/124; 426/396; 426/412; 426/643; 426/415
[58] Field of Search ........... 426/129, 412, 643, 402, 426/400, 401, 407, 325, 324, 124, 396, 415

[56] References Cited

U.S. PATENT DOCUMENTS

| 2,088,831 | 8/1937 | Ash et al. | 426/643 |
| 3,912,823 | 10/1975 | Kane | 426/412 |
| 3,956,867 | 5/1976 | Utz et al. | 426/412 |
| 4,411,919 | 10/1983 | Thompson | 426/412 |
| 4,419,370 | 12/1983 | Yamamoto | 426/643 |
| 4,448,792 | 5/1984 | Schirmer | 426/412 |
| 4,469,742 | 9/1984 | Oberle | 426/412 |
| 4,606,922 | 8/1986 | Schirmer | 426/129 |
| 4,642,239 | 2/1987 | Gerrar et al. | 426/129 |

FOREIGN PATENT DOCUMENTS

| 5119157 | 2/1976 | Japan | 426/643 |
| 5230580 | 8/1977 | Japan | 426/643 |
| 54-53092 | 4/1979 | Japan | 426/412 |
| 59-151864 | 8/1984 | Japan | 426/643 |
| 59-166061 | 9/1984 | Japan | 426/643 |
| 59-198957 | 11/1984 | Japan | 426/643 |
| 61-247365 | 11/1986 | Japan | 426/407 |
| 805985 | 12/1958 | United Kingdom | 426/412 |
| 1382290 | 1/1975 | United Kingdom | 426/643 |
| 1385556 | 2/1975 | United Kingdom | 426/643 |
| 1440658 | 6/1976 | United Kingdom | 426/412 |

Primary Examiner—Steven Weinstein
Attorney, Agent, or Firm—Oblon, Fisher, Spivak, McClelland & Maier

[57] ABSTRACT

The present invention relates to a retort vessel containing fish which is excellent in quality and impact resistance strength. The vessel containing broiled fish of the present invention comprises broiled fish the meat of which has a hardness of 85 g to 1500 g and a retort vessel made of a flexible material in which said broiled fish is received, said broiled fish being vacuum-packaged so that air content becomes 25% or less and then subjected to retort sterilization processing.

6 Claims, 3 Drawing Sheets

METHOD OF RETORT PACKAGING BROILED FISH AND PRODUCT THEREOF

BACKGROUND OF THE INVENTION (1) Field of the Invention

The present invention relates to broiled fish placed in a retort vessel which is excellent in quality and impact resistance strength.

(2) Prior Art

Retort foods made from fish materials have been proposed in Japanese patent un-examined publication Nos. 175477/1983 and 42838/1984. The former is a technique wherein a raw fish and a flavoring liquid are put in a retort pouch and subjected to retort sterilization processing after deaeration and sealing so that the fish may be cooked without generation of any curd or breakage during the sterilization. The latter is a technique wherein the meat of a white fish is soaked in an acid solution, steam cooked, and then put in a retort pouch into which a flavoring liquid has been poured so that the pH value of the fish meat assumes a particular value, and which is packed under vacuum and sterilized at a given temperature and under a given pressure. This technique has the effect of preventing the generation of any curd or breakage during sterilization.

However, retort foods of the types of fish proposed in the above-described known literature relate to so-called "boiled fish" which are obtained by retort sterilization of vessels in which the bodies of fish and flavoring liquids are received. On the other hand, no retort food consisting of "broiled fish" has been proposed under the present conditions.

The inventors of the present invention have paid particular attention to retort foods consisting of broiled fish, and have formed various retort foods by way of experiment and investigated them. As a result, the inventors have found that when retort foods consisting of broiled fish are manufactured, the particular problems described below are produced.

One problem is that, in the case of a retort food consisting of broiled fish, a fish body is directly received in a vessel (no fish stock is contained in the vessel as in the case of boiled fish) and thus any impact applied to the vessel from the exterior may easily damage the fish body so that the broiled fish is easily broken and its epidermis may easily be separated from it during retort sterilization or transportation.

Another problem is that, during retort sterilization, water separates from the fish body and juice (referred to as "drips" hereinafter) is generated. These drips are held between the fish body and the inside of a vessel, resulting in great deterioration of the feeling and taste of dryness which are required of broiled fish. In particular, the drips flow out and oils present in the drips adhere to and solidify on the surface of the fish during cooling, resulting in great deterioration of the appearance, if the vessel is transparent.

SUMMARY OF THE INVENTION

It is, therefore, a primary object of the present invention to solve the above-described problems and to provide a retort vessel with a broiled fish placed therein which enables the generation of drips to be kept at a minimum level, is excellent in quality, and which has an increased impact resistance strength during retort sterilization and transportation.

As the result of repeated production trials and investigations performed with a view to achieving the above objects, the inventors of the present invention have completed the invention described below.

In accordance with the present invention, there is provided a broiled fish placed in a retort vessel comprising a broiled fish having 85 g to 1500 g of a hardness of fish meat which is received in a retort vessel made of a material having flexibility, packed under vacuum so that the air content is 25% or less, and then subjected to retort sterilization processing.

The above and other objects of the present invention will be clear from the following description.

DESCRIPTION OF THE PREFERRED EMBODIMENTS

Figure 1A:
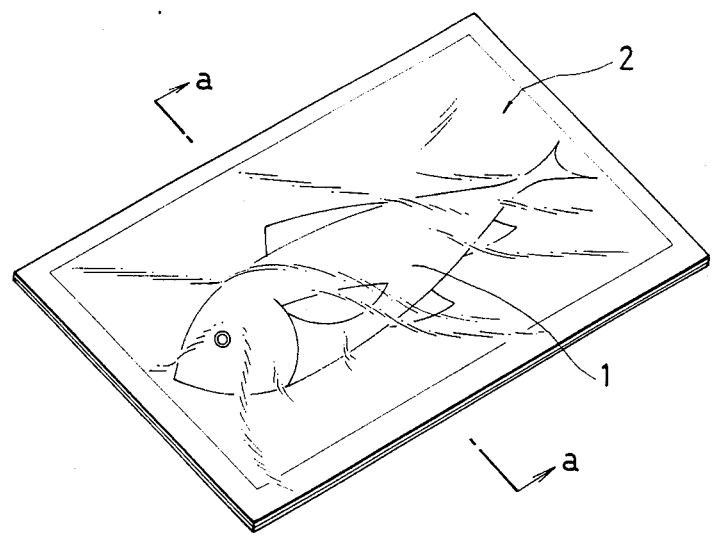
FIGS. 1A, 2A and 3A are perspective views respectively showing embodiments of the broiled fish in the retort vessel of the present invention.
Figure 1B:
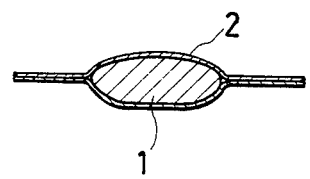
FIGS. 1B, 2B, and 3B are sectional views respectively taken on line a—a of FIG. 1A, on line b—b of FIG. 2A and on line c—c of FIG. 3A. In these FIGS., 1 . . . broiled fish, 2 . . . retort vessel, 3, 5 . . . dish-formed vessel, 4 . . . cover material made of film, 6 . . . bag-formed vessel made of film, 8 . . . flange.

The present invention is described below in detail with reference to the drawings. FIG. 1A is a perspective view of an embodiment of the broiled fish placed in a retort vessel of the present invention, and FIG. 1B is a sectional view taken on line a—a of FIG. 1A.

A broiled fish 1 is obtained by baking a fish. Any kinds of fish may be used, and sardine, horse mackerel, pacific saury, mackerel, salmon, yellowtail, spanish mackerel, herring, eel, conger eel, flatfish, sea beam, and pollack may be exemplified. Among these, it is preferable to use sardine, horse mackerel, pacific saury, mackerel, salmon or yellowtail. Any means may be employed for baking the fish material, for example, direct heating by flame or infrared rays may be employed.

In the present invention, it is necessary that the fish meat of the broiled fish 1 baked in the above-described manner has a hardness of 85 g to 1500 g, and preferably 105 g to 1250 g. It is therefore possible to prevent the fish meat from being broken when the broiled fish 1 is packed in a vessel under vacuum so that the vessel contains a particular ratio of air, as described below. Furthermore, the vacuum packaging of the broiled fish 1 having a particular hardness in the retort vessel 2 which is performed with a high degree of adhesion enables the flow of drips from the fish body to be kept at a minimum level during the retort sterilization. In addition, it is possible to prevent to the maximum extent breakage of the fish body and separation of the epidermis during retort sterilization and transportation. Among the above-described baking means, direct heating with a flame of medium or low strength is particularly preferable as this allows the fish to be baked such as to have a particular hardness.

The hardness of the broiled fish 1 is determined by the measuring method described below. The fish meat of the broiled fish 1 which has been baked and then cooled at room temperature is cut into 1 $cm^3$ cubes to form samples, and a force is applied to each sample perpendicular to the muscle fiber of the fish meat thereof to allow the hardness of the broiled fish 1 to be measured by using a rheometer (produced by Fudo Kogyo Co., Ltd.). In this regard, the measurement conditions are a plunger diameter of 30 mm, a lifting speed of 6 cm/min, and a clearance of 5 mm. The hardness of the broiled fish 1 usually is between 40 g and 1500 g after the broiled fish having a given hardness has been packaged in the retort vessel 2 under vacuum and subjected to retort sterilization.

The broiled fish 1 may have any form such as a complete fish (including a fish body having no gut) or slices obtained by cutting a fish in a suitable manner (half-body or a fish opened into two pieces). With a view to preventing the flow of drips during retort sterilization, it is preferable for the broiled fish 1 to be a complete fish, but in the case of slices, it is preferable to cut the raw fish into slices and then bake it.

The retort vessel 2 is a bag-like vessel for receiving the broiled fish 1 therein. The retort vessel 2 is formed into a bag by laying one sheet of film material on the other and sealing together the peripheries thereof, or by folding back a sheet of film material and sealing the periphery thereof.

The retort vessel 2 may be of any material which is waterproof and can withstand heat during the retort sterilization. Examples of suitable materials include nylon, polyethylene, polyester, polypropylene, vinylidene chloride, and suitable laminates thereof. In order to provide the retort vessel 2 with an ultraviolet screening property, it is preferable to use materials comprising the above-described with aluminum foils laminated thereon. It is also preferable to use materials having an aluminum sheet as an intermediate layer between sheets formed of the above-described plastics.

An important characteristic of the present invention is that the whole or a part of the retort vessel 2 is specifically formed of a flexible material among the above-described materials. Namely, in FIG. 1, the whole of the retort vessel 2 is formed of a flexible material. In order to obtain good flexibility, it is preferable for the flexible materials to have, in particular, a flexual property (ASTM D 790) not exceeding 21000 kg/cm$^2$, more preferably not exceeding 15000 kg/cm$^2$, and most preferably 70 to 12000 kg/cm$^2$, and a thickness of 200$\mu$ or less, preferably 5$\mu$ to 200 $\mu$.

The formation of the retort vessel 2 from a flexible material, as described above, enables the vacuum packaging of the broiled fish 1 in the retort vessel 2 with a low air content. At the same time, it is possible to prevent to the maximum extent the generation of drips and the hardening of the fish meat due to the transpiration of water from the surface of the fish body and to improve the impact resistance strength.

In addition to the above-described effects, it is possible when flexible materials have transparency or gloss to obtain broiled fish placed in a retort vessel having excellent appearance which gives the fish body the feeling of a solid body and freshness. Transparent materials may have a haze (ASTM D 1003-61) of 15% or less, preferably 4.5% or less. Glossy materials may have glossiness (20% Gardner Glossmeter) of 70% or more, preferably 90 to 180%.

The formation of the retort vessel 2 from a material having gas barrier and ultraviolet screening properties enables an increase in the keeping quality of the broiled fish 1. In addition, if a material containing no aluminum foil is used from among the above-described materials, the retort vessel 2 can be heated in an electronic oven.

The broiled fish in a retort vessel of the present invention is formed by accommodating the above-described broiled fish 1 in the retort vessel 2, packaging it under vacuum, and then conducting retort sterilization.

The broiled fish 1 is packaged under vacuum in the retort vessel 2 by a conventional method, for example, by vacuum-sealing by a vacuum packaging machine.

The above-described vacuum packaging is specifically performed such that the air content becomes 25% or less, more preferably 15% or less, of total content of the vessel, i.e., total volume of the air content and volume of the broiled fish. Consequently, with the flexibility of the retort vessel 2, it is possible to package the broiled fish 1 in the retort vessel 2 under vacuum with a very high degree of adhesion, improve the capability to prevent drips and hardening of the fish meat during sterilization and the impact resistance strength, and to obtain broiled fish in a retort vessel having an excellent appearance.

Finally, the broiled fish 1 packaged under vacuum in the above-described manner is subjected to retort sterilization processing by a conventional method, for example, a hot-water retort or a steam retort. The retort sterilization processing performed, for example, at a pressure of 0.8 to 1.7 kg/cm$^2$ (gauge pressure), preferably at 1 to 1.5 kg/cm$^2$ (gauge pressure), at a temperature of 115° to 130° C., preferably 121° to 127° C., for 5 to 60 minutes.

Figure 2A:
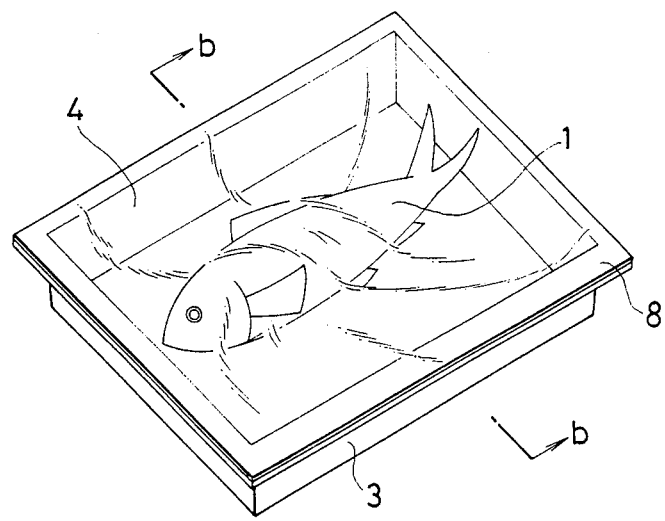
Figure 2B:
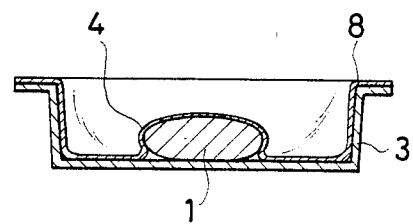

FIG. 2A is a perspective view of another embodiment of a retort vessel containing broiled fish in accordance with the present invention, and FIG. 2B is a sectional view taken on line b—b of FIG. 2A. In the drawings, the retort vessel containing the broiled fish is produced by covering the upper open portion of a dish-type vessel 3 with a cover material 4 made of a film in the state wherein broiled fish 1 is placed on the dish-type vessel 3 (the dish-type vessel 3 being covered with the cover film material 4 by heat sealing or bonding at upper flange 8 thereof), and vacuum packaging of the fish which is then subjected to retort sterilization processing.

Figure 3A:
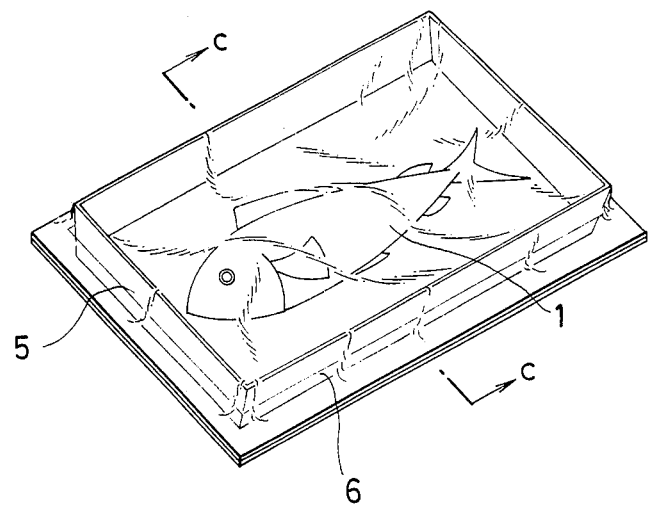
Figure 3B:
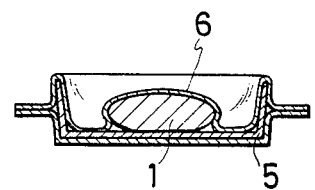

FIG. 3A is a perspective view of a further embodiment of a retort vessel containing a broiled fish, and FIG. 3B is a sectional view taken on line c—c of FIG. 3A. The retort vessel containing broiled fish in the drawing is produced by vacuum packaging broiled fish 1 in a bag-formed vessel 6 made of a film in the state wherein the broiled fish 1 is loaded on a dish-type vessel 5, and then conducting retort sterilization processing.

In the retort vessels containing broiled fish shown in FIGS. 2A and 3A, the broiled fish 1 are the same as that shown in FIG. 1A.

The dish-type vessels 3 and 5 are formed vessels comprising side and bottom walls. The heights of the side walls of the dish-type vessels 3 and 5 are preferably the same as or slightly greater than that of the broiled fish 1 from the viewpoint of preventing any damage to meat quality and the epidermis thereof. The dish-type vessels 3 and 5 may take any form, such as that of a cup and flat plate, in addition that shown in the drawings. The materials of the dish-type vessels 3 and 5 may be any materials which are waterproof and can withstand the heat during the retort sterilization. Examples of suitable materials include nylon, polyethylene, polyester, polypropyrene, vinylidene chloride, paper materials, and suitable laminates thereof. In order to provide the dish-type vessels 3 and 5 with an ultraviolet screen property, it is preferable to use materials comprising the above-described with aluminum foils laminated thereon or having an aluminum sheet as an intermediate layer between sheets formed of the above-described.

For the broiled fish shown in FIGS. 2A and 3A, the cover film material 4 and the bag-formed vessel made of film are formed from a flexible material which is the same as the retort vessel 2 in FIG. 2A, so that it is possible to achieve the high-adhesion packaging which is desired in the present invention. The structure of the bag-formed vessel 6 made of film is the same as that of the retort vessel 2 shown in FIG. 1A.

Since the broiled fish in the retort vessel of the present invention with the form as described above in which broiled fish having a given hardness is vacuum-packaged in a flexible retort vessel with a low air content, the broiled fish can be packaged in the vessel with a very high degree of adhesion and the meat thereof is difficult to break.

In addition, the contact packaging of the broiled fish described above can keep to the minimum level the flow of drips from the fish body during retort sterilization and prevent the hardening of the meat on the surface of the fish body. Furthermore, since the fish meat has a given hardness and the fish body is fixed in the retort vessel in such a manner as to be immobilized, it is possible to prevent to the maximum extent breakage of the fish body and separation of the epidermis during retort sterilization or transportation. When the retort vessel is made of a transparent material, the fish body has an excellent appearance of solidity and freshness.

The retort vessel containing broiled fish of the present invention allows the broiled fish to be made edible by a very simple operation such as the heating of the vessel with hot water or an electronic oven.

What is claimed is:

1. A sterilized vacuumized retort package containing broiled fish selected from the group consisting of sardine, horse mackerel, pacific saury, mackerel, salmon, yellowtail, spanish mackerel, herring, eel, conger eel, flatfish, sea beam, and pollack, the meat of said broiled fish having a hardness of 105 g to 1250 g, said package made of a flexible material in which said broiled fish is received, said broiled fish being vacuum-packaged such that the flexible material substantially conforms to the shape of the fish and then subjected to retort sterilization processing, said broiled fish thereby being packaged in said package with a very high degree of adhesion, with substantial prevention of breakage of the fish body and separation of the epidermis during retort sterilization and subsequent transportation, with substantial elimination of the formation of drips and hardening of the meat during sterilization, and being of excellent quality and appearance.

2. A retort package containing broiled fish according to claim 1, wherein the flexible material has a flexural property of not more than 21000 kg/cm$^2$ and a thickness of not more than 200$\mu$.

3. A retort package containing broiled fish according to claim 1, wherein the flexible material has a haze of 15% or less.

4. A retort package containing broiled fish according to claim 1, wherein the flexible material has a flexural property of not more than 15000 Kg/cm$^2$ and a thickness of 5 to 120$\mu$.

5. A retort package containing broiled fish according to claim 1, wherein the flexible material has a flexural property of 70 to 12000 kg/cm$^2$ and a thickness of 5 to 120$\mu$.

6. A process for preparing a retort package containing broiled fish, which comprises the steps of placing a broiled fish selected from the group consisting of sardine, horse mackerel, pacific saury, mackerel, salmon, yellowtail, spanish mackerel, herring, eel, conger eel, flatfish, sea beam, and pollack, the meat of said broiled fish having a harness of 105 g to 1250 g in a retort package made of a flexible material, and vacuum-packing said package such that the flexible material substantially conforms to the shape of said fish and then subjecting the vacuum packaged fish to retort sterilization processing, said broiled fish thereby being packaged in said package with a very high degree of adhesion, with substantial prevention of breakage of the fish body and separation of the epidermis during retort sterilization and subsequent transportation, with substantial elimination of the formation of drips and hardening of the meat during sterilization, and being of excellent quality and appearance.

* * * * *